US012665426B2

(12) United States Patent
Lee et al.

(10) Patent No.: US 12,665,426 B2
(45) Date of Patent: Jun. 23, 2026

(54) SYSTEM AND METHOD FOR CONTROLLING CHARGING/DISCHARGING OF VEHICLE

(71) Applicants:Hyundai Motor Company, Seoul (KR); Kia Corporation, Seoul (KR)

(72) Inventors: Myoung Seok Lee, Seoul (KR); Soung Han Noh, Yongin-si (KR); Na Lae Kwon, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 727 days.

(21) Appl. No.: 17/815,106

(22) Filed: Jul. 26, 2022

(65) Prior Publication Data

US 2023/0144661 A1 May 11, 2023

(30) Foreign Application Priority Data

Nov. 9, 2021 (KR) ........................ 10-2021-0152948

(51) Int. Cl.
| | |
|---|---|
| *H02J 3/32* | (2006.01) |
| *B60L 53/16* | (2019.01) |
| *B60L 53/18* | (2019.01) |
| *B60L 53/62* | (2019.01) |
| *B60L 55/00* | (2019.01) |
| *H02J 7/00* | (2006.01) |

(52) U.S. Cl.
CPC .............. *H02J 3/322* (2020.01); *B60L 53/16* (2019.02); *B60L 53/18* (2019.02); *B60L 53/62* (2019.02); *H02J 7/0048* (2020.01); *H02J*

*7/00712* (2020.01); *B60L 55/00* (2019.02); *H02J 2310/48* (2020.01); *Y02T 90/14* (2013.01)

(58) Field of Classification Search
None
See application file for complete search history.

(56) References Cited

U.S. PATENT DOCUMENTS

| | | | |
|---|---|---|---|
| 10,549,644 B2 | 2/2020 | Kojima | |
| 2015/0137752 A1* | 5/2015 | Shinzaki | ............... H02J 7/0048 320/132 |
| 2016/0152154 A1 | 6/2016 | Mizuno et al. | |
| 2018/0037128 A1* | 2/2018 | Gerber | ...................... H02J 7/00 |
| 2018/0072169 A1 | 3/2018 | Lee et al. | |
| 2018/0186244 A1* | 7/2018 | Harvey | ................. H02J 7/0031 |

(Continued)

FOREIGN PATENT DOCUMENTS

| | | | |
|---|---|---|---|
| CN | 106744517 A | * | 5/2017 |
| JP | 2003206838 A | | 7/2003 |
| JP | 2013143817 A | | 7/2013 |

(Continued)

*Primary Examiner* — Julian D Huffman
*Assistant Examiner* — John P Ondrasik
(74) *Attorney, Agent, or Firm* — Slater Matsil, LLP

(57) ABSTRACT

An embodiment system for controlling charging/discharging of a vehicle includes a vehicle battery, an external controller connected to the vehicle and configured to control exchange of power, a switch configured to connect/disconnect the vehicle battery to/from the external controller, and a charging/discharging controller configured to control the vehicle battery and the external controller to be connected to each other by closing the switch in an event in which the vehicle is started or a charging door is opened.

19 Claims, 5 Drawing Sheets

(56)     References Cited

U.S. PATENT DOCUMENTS

2020/0324665  A1 *  10/2020  Mackenzie  ............ B60L 53/22

FOREIGN PATENT DOCUMENTS

| | | | | | |
|----|----|----|----|----|----|
| JP | 2013158218 | A | | 8/2013 | |
| JP | 2015139325 | A | | 7/2015 | |
| JP | 2018157719 | A | | 10/2018 | |
| JP | 2019004579 | A | | 1/2019 | |
| JP | 2021040401 | A | | 3/2021 | |
| KR | 20170133634 | A | | 12/2017 | |
| KR | 20210108857 | A | | 9/2021 | |
| WO | WO-2013115193 | A1 | * | 8/2013 | .......... B60L 11/1818 |
| WO | WO-2019043997 | A1 | * | 3/2019 | |

* cited by examiner

SYSTEM AND METHOD FOR CONTROLLING CHARGING/DISCHARGING OF VEHICLE

CROSS-REFERENCE TO RELATED APPLICATIONS

This application claims the benefit of Korean Patent Application No. 10-2021-0152948, filed on Nov. 9, 2021, which application is hereby incorporated herein by reference.

TECHNICAL FIELD

The present invention relates to a system and a method for controlling charging/discharging of a vehicle.

BACKGROUND

Technology for supplying electric power from an electric vehicle battery to a home is called vehicle-to-home (V2H) technology. Due to the V2H technology, electric vehicles serve as both a power storage device and a power supply device. In particular, in the event of power failure due to unforeseen circumstances, V2H technology can be used to supply electricity to homes from electric vehicles. Furthermore, if victims are not provided with electricity due to disasters (typhoons, floods, earthquakes, etc.), it is possible to quickly supply electricity to temporary housing facilities through V2H technology.

V2H technology includes a device that converts a DC voltage of an electric vehicle battery into AC for home use and also includes a controller that can communicate with the vehicle.

A vehicle charging management system (VCMS) is a controller that controls charging and discharging of electric vehicles and performs a charging/discharging sequence, diagnosis, and the like while exchanging information with a V2H system and a high-voltage battery. In general, since a DC voltage of an electric vehicle (EV) battery is transmitted through V2H, it often follows the Charge de Move (CHAdeMO) standard.

In the case of supplying power through V2H, power is converted into AC power used at home using an inverter called an electric vehicle power system (EVPS), and the power is supplied through three methods, in general.

First, the EVPS and a distribution board can be configured independently. This refers to a case in which an EVPS connected to an electric vehicle is installed in a home and an outlet connected to the EVPS is located in the home. Here, the outlet connected to the EVPS is placed in an independent state in which it is not connected to a home switchboard. That is, the outlet connected to the EVPS cannot be used because electricity is not supplied unless it is connected through V2H technology.

Second, the EVPS and the distribution board can be configured such that they can be selected. In this case, the EVPS and the distribution board are not directly connected, and it is possible to select whether to connect the distribution board or a V2H system through a switching device or the like.

Third, a structure in which bidirectional V2H technology is possible can be configured. In this case, the distribution board is connected to the EVPS through a power converter, and as the power converter changes the flow of electricity according to intention to use electricity, the electric vehicle supplies electricity to the home through the EVPS and the vehicle can be charged through the EVPS.

V2H technology follows the standard of supplying power after a compatibility check with respect to a vehicle is completed. Here, the V2H system needs to be able to operate even in a situation in which power is cut off in a home. When power is cut off in the home, the power of a V2H controller is cut off and thus V2H communication with the vehicle is impossible. Therefore, it is necessary to supply not only the power to be supplied, but also the power (12 V) of the V2H controller from the vehicle.

In order to supply power to a home through a V2H system, a VCMS of a vehicle and the V2H controller need to communicate with each other first. For this, VCMS power needs to be activated by turning on an ignition to perform the V2H technology. However, when the ignition is turned on, not only the parts necessary for the V2H system but also the power of all parts in the vehicle are activated, and thus unnecessary current is consumed.

As another method for the VCMS and the V2H controller to communicate, only the power of the controller necessary for the V2H system can be activated by setting an audio, video, navigation (AVN). However, this is inconvenient for a user because the user needs to set the AVN while moving indoors and outdoors.

On the other hand, as a method of supplying power from the vehicle to the V2H controller, there is a method of using pin #3 of a CHAdeMO charging port, which has the advantage that V2H power can be supplied by connecting only a V2H cable. However, a protection circuit such as a fuse needs to be added, and in order to supply V2H power, it is necessary to turn on the ignition of the vehicle and set a V2H mode.

Therefore, there is a need to develop a technology capable of supplying power from a vehicle battery to a V2H controller and allowing the V2H operation only by connecting a cable without special manipulation by a user.

It will be understood that the above matters described in the related art are merely for promotion of understanding of the background of the invention and should not be recognized as prior art known to those skilled in the art.

SUMMARY

The present invention relates to a system and a method for controlling charging/discharging of a vehicle. Particular embodiments relate to vehicle-to-home (V2H) technology for supplying battery power of a vehicle to a home, and more specifically, to a system and method for controlling charging/discharging of a vehicle to supply power to a V2H controller using a vehicle battery even when power supplied to a home is cut off.

Therefore, embodiments of the present invention have been made in view of problems in the art, and an embodiment of the present invention provides a system and method for controlling charging/discharging of a vehicle which can activate power of a V2H system by supplying power from a vehicle battery and allow a V2H operation even if a user does not start the vehicle or set the V2H mode.

In accordance with an embodiment of the present invention, a system for controlling charging/discharging of a vehicle is provided including a vehicle battery capable of charging and discharging, an external controller connected to the vehicle to control exchange of power, a switch for connecting/disconnecting the vehicle battery to/from the external controller, and a charging/discharging controller for controlling the vehicle battery and the external controller to be connected to each other by closing the switch when the vehicle is started or a charging door is opened.

Further, power of the charging/discharging controller may be activated upon recognition of starting of the vehicle or opening of the charging door, the vehicle battery and the external controller may be connected through a charging inlet of the vehicle, and the charging inlet of the vehicle may be configured to use a pin that is unused among a plurality of pins of a charging port when a charging cable is connected to charge the vehicle.

Further, the charging/discharging controller may include a microcontroller unit (MCU) and control the vehicle battery and the external controller to be connected to each other by closing the switch even using a signal from the MCU, the charging/discharging controller may determine whether the vehicle battery is connected to a charger or the external controller after power is activated, may open the switch when the vehicle battery is connected to the charger, and may maintain the switch in a closed state when the battery is connected to the external controller.

Further, the charging/discharging controller may perform control such that only power of systems related to charging/discharging is activated, and when the external controller is turned off, may open the switch and switch to a power saving mode in which a cable is removable.

Further, the external controller may set a termination command or a minimum state of charge (SOC) of the battery using a mobile device.

In accordance with another embodiment of the present invention, there is provided a method for controlling charging/discharging of a vehicle including activating power of a charging/discharging controller upon recognition of starting of the vehicle or opening of a charging door, closing a switch connected between a vehicle battery and an external controller by the charging/discharging controller, and activating power of the external controller by supplying power of the vehicle battery to the external controller.

In the activating of the power of the external controller, the power of the vehicle battery may be supplied to the external controller through a pin that is unused among a plurality of pins of a charging port when a charging cable is connected to charge the vehicle.

The closing of the switch may include controlling, by the charging/discharging controller, the vehicle battery and the external controller to be connected to each other by closing the switch using an MCU signal, determining, by the charging/discharging controller, whether the vehicle battery is connected to a charger or the external controller, opening the switch when the vehicle battery is connected to the charger, and maintaining the switch in a closed state when the vehicle battery is connected to the external controller.

Further, the charging/discharging controller may perform control such that only power of systems related to charging/discharging is activated, and the method may further include setting a termination command or a minimum state of charge (SOC) of the battery by an external controller using a mobile device.

BRIEF DESCRIPTION OF THE DRAWINGS

The above and other objects, features and other advantages of embodiments of the present invention will be more clearly understood from the following detailed description taken in conjunction with the accompanying drawings, in which:

FIG. 1 is a block diagram showing V2H power supply through a VCMS according to embodiments of the present invention;

DETAILED DESCRIPTION OF ILLUSTRATIVE EMBODIMENTS

Figure 1:
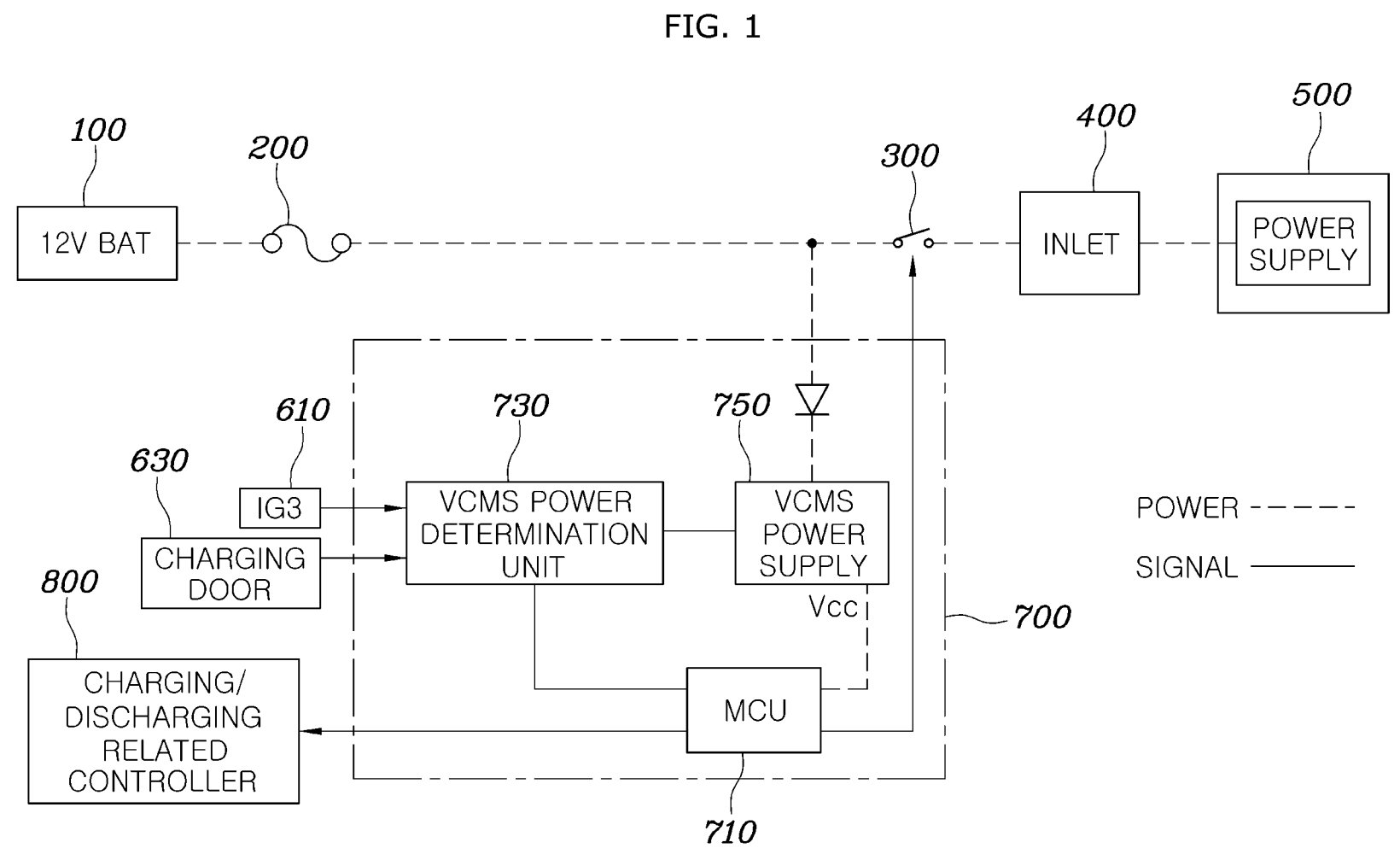
Figure 2:
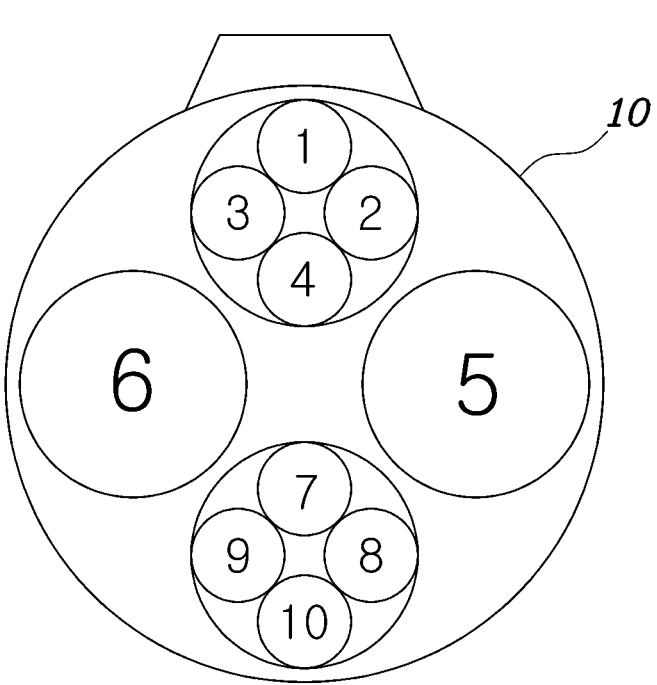
FIG. 2 is a diagram showing the shape and pin configuration of a CHAdeMO charging port.
Figure 3:
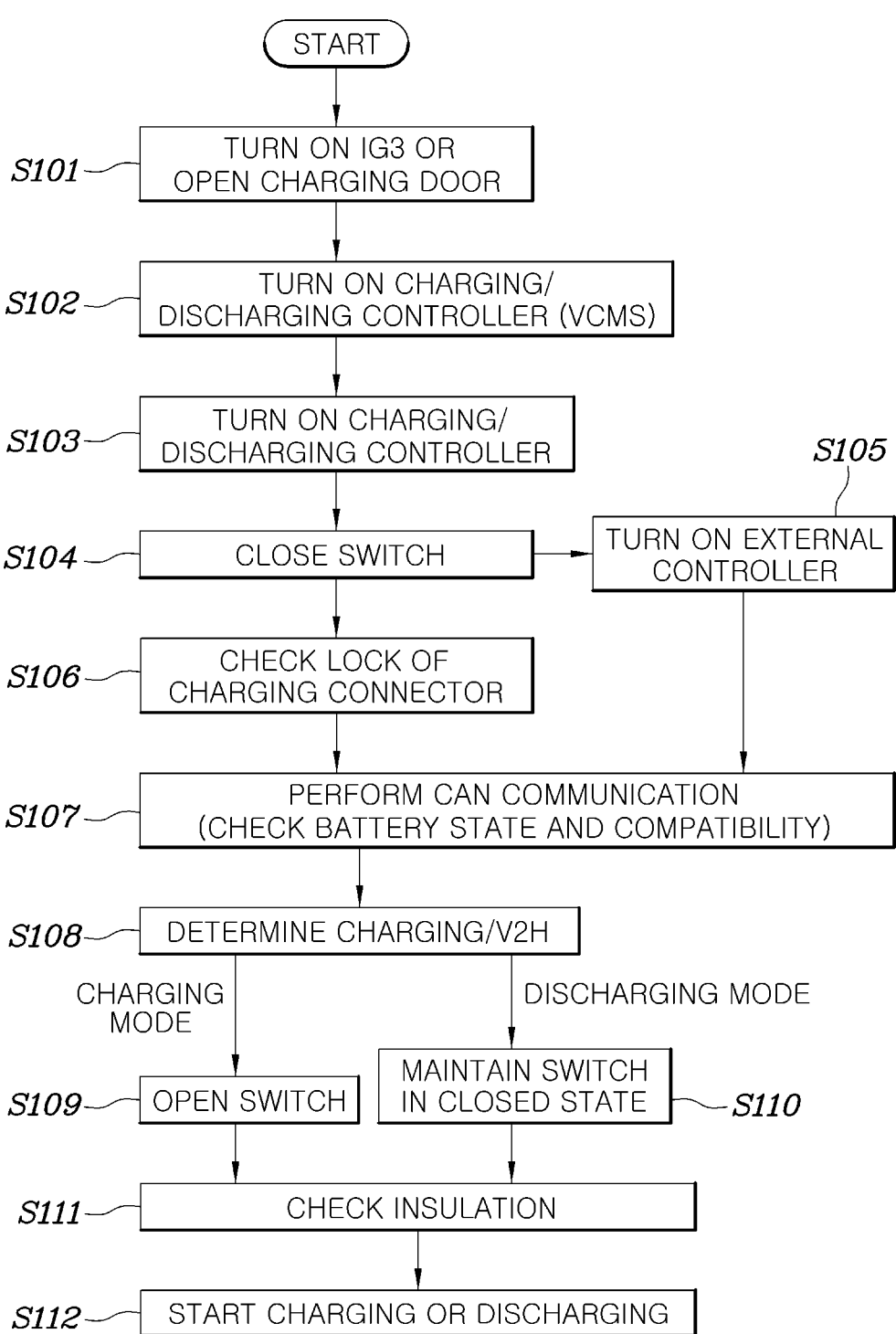
FIG. 3 is a flowchart of a V2H power supply scenario according to an embodiment of the present invention.
Figure 4:
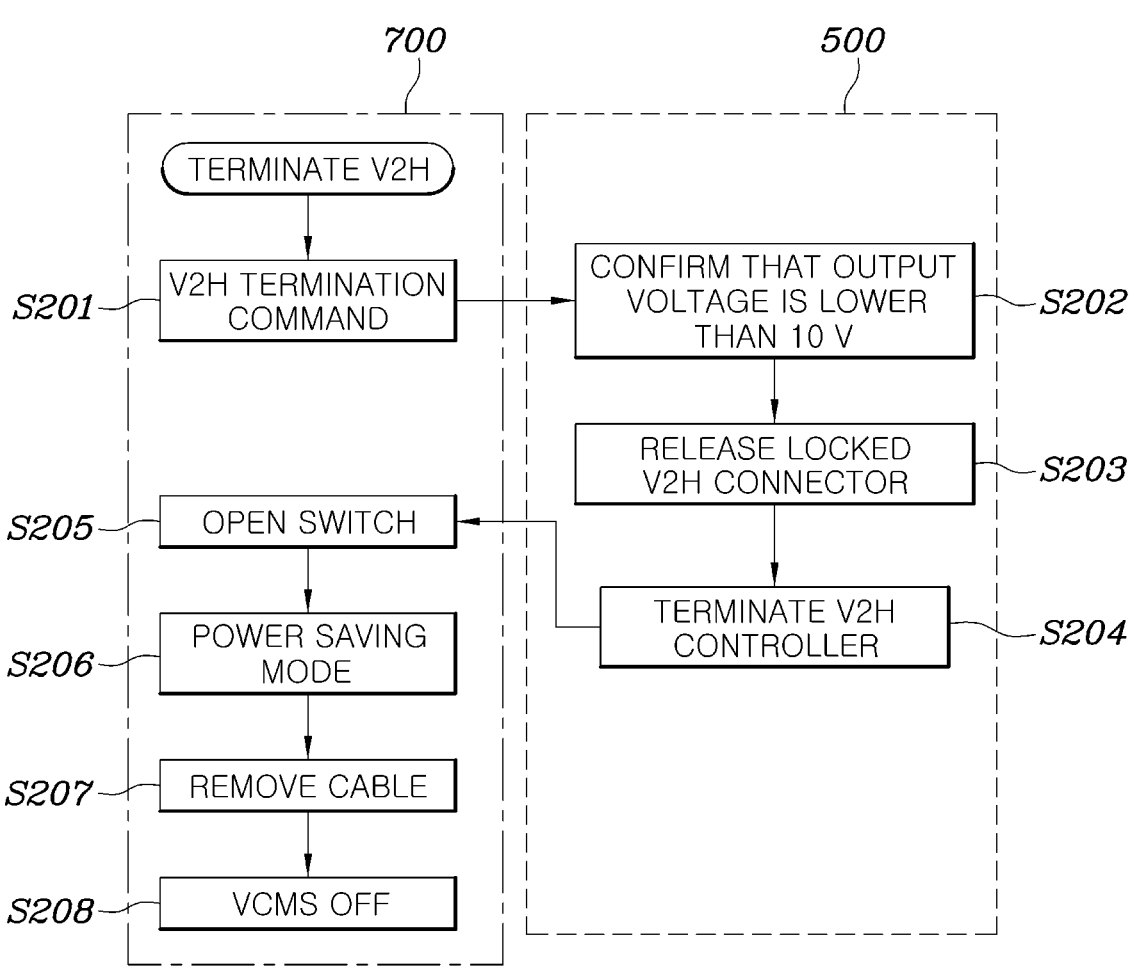
FIG. 4 is a flowchart of a V2H power off scenario according to an embodiment of the present invention.
Figure 5:
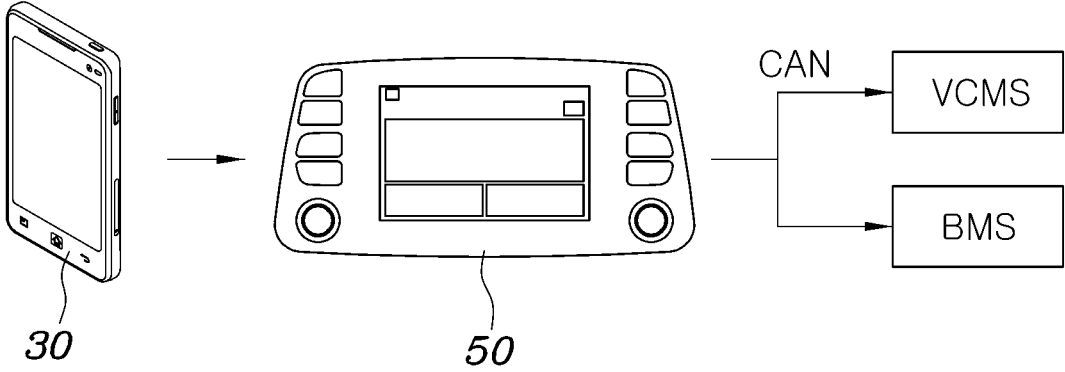
FIG. 5 is a conceptual diagram of control through a mobile device according to an embodiment of the present invention.

FIG. 1 is a block diagram showing V2H power supply through a VCMS according to embodiments of the present invention, FIG. 2 is a diagram showing the shape and pin configuration of a CHAdeMO charging port, FIG. 3 is a flowchart showing a V2H power supply scenario according to an embodiment of the present invention, FIG. 4 is a flowchart showing a V2H power off scenario according to an embodiment of the present invention, and FIG. 5 is a conceptual diagram of control through a mobile device according to an embodiment of the present invention.

FIG. 1 is a block diagram showing V2H power supply through a VCMS according to embodiments of the present invention.

A vehicle charging management system (VCMS) may include a battery 100 of a vehicle, a charging/discharging controller, a rapid inlet 400, and a switch 300, and operates by receiving power from the battery 100 in the vehicle and implements V2H technology by being connected to an external controller 500.

A controller according to an exemplary embodiment of the present invention may include a non-volatile memory (not shown) configured to store an algorithm configured to control operations of various components of a vehicle or data relating to software instructions for implementing the algorithm, and a processor (not shown) configured to perform operations which will be described below using data stored in the memory. Here, the memory and the processor may be implemented as separate chips. Alternatively, the memory and processor may be implemented as a single integrated chip, and the processor may include one or more processors.

The battery 100 of the vehicle is a battery capable of charging and discharging and may be configured as a 12 V battery in general. The battery 100 of the vehicle may be connected to the power of the external controller 500 through the switch 300 and the rapid inlet 400. Here, a fuse 200 for protecting the circuit may be provided between the battery 100 and the inlet 400.

The rapid inlet 400 is a vehicle charging port and generally serves to directly connect to the high voltage battery 100 using a high DC voltage without passing through an on-board charger (OBC). As an embodiment, a DC combo type in which slow charging and quick charging can be performed through one charging port or CHAdeMO 10 may be used. As an embodiment, when a charging port of the CHAdeMO 10 is used, V2H power can be supplied between the battery 100 of the vehicle and the external controller 500 through pin #3 of the CHAdeMO 10. Further, pin #3 may also be used when the power of the battery 100 of the vehicle is supplied for power to the external controller 500. However, when a charger for vehicle charging other than the external controller 500 for V2H power is connected, pin #3 may not be used.

The switch 300 is provided between the battery 100 of the vehicle and the rapid inlet 400 and serves to connect/disconnect the battery 100 and the external controller 500. As an embodiment, when the switch 300 is closed, the battery 100 of the vehicle is connected to the power supply of the external controller 500, and thus power is supplied to the external controller 500. On the other hand, when the power of the external controller 500 needs to be cut off, the switch 300 is opened.

The charging/discharging controller 700 controls power activation of the VCMS and controls connection or cut-off of the switch 300. Specifically, when the power of the vehicle is activated or a charging door 630 of the vehicle charging port is opened, the power of the VCMS is activated. In this case, the power of the vehicle may be an IG3 power supply 610, which is a charging/discharging related power supply used only at the time of charging an electric vehicle.

In one embodiment, when the IG3 power supply 610 is activated or opening of the charging door 630 is detected, a VCMS power determination unit 730 activates a VCMS power supply 750. As the VCMS power supply 750 is activated, the power of a microcontroller unit (MCU) 710 may also be activated to control the switch 300 and a charging/discharging related controller 800. Accordingly, only the power of the controller required for the V2H operation can be activated.

As another embodiment, the VCMS power supply 750 may be activated by a signal from the MCU 710. More specifically, after the VCMS power supply 750 is activated and thus the MCU 710 is also activated, the power of the VCMS may be suddenly turned off. In this case, it is necessary to re-activate the power of the VCMS for stable V2H system termination.

The charging/discharging controller 700 controls the switch 300 provided between the battery 100 of the vehicle and the external controller 500 through the MCU 710. In this case, when the power of the VCMS is activated, the switch 300 is closed such that the power of the external controller 500 for the V2H operation is activated. Then, it is determined whether the VCMS is connected to the charger or is connected to the external controller 500 for the V2H operation. Here, the switch 300 is opened when it is determined that the VCMS is connected to the charger, and the switch 300 is maintained in a closed state when it is determined that the VCMS is connected to the external controller 500.

FIG. 2 is a diagram showing the shape and pin configuration of the CHAdeMO quick charging port 10. The CHAdeMO uses a 10-pin connector, and as shown in FIG. 2, pin #1 is for GND, pin #2 is for CSS1 (Charge Sequence Signal 1), pin #3 is unused, pin #4 is for vehicle charge permission, pin #5 is for DC output N, pin #6 is for DC output P, pin #7 is for connector proximity detection, pins #8 and #9 are for CAN, and pin #10 is for CCS2 (Charge sequence signal 2).

Pin #3 is not used when a charging cable is connected in order to charge the vehicle. However, when a V2H operation is performed, power can be supplied through pin #3 of the CHAdeMO 10, which allows power supply only by connecting a V2H cable without an additional cable.

FIG. 3 is a flowchart of a V2H power supply scenario according to an embodiment of the present invention.

First, when the IG3 power supply 610 of the vehicle is activated or opening of the charging door 630 is detected, the power of the VCMS and the MCU 710 is activated (S101 and S102). The MCU 710 activates the power of a battery management system (BMS), a bidirectional OBC, a low voltage DC-DC converter (LDC), and the like, which are charging/discharging related systems in the VCMS upon activation of the power thereof (S103). In addition, the switch 300 capable of connecting the battery 100 of the vehicle and the external controller 500 is closed (S104) such that the power of the external controller 500 is activated (S105). At this time, for safety, a procedure for checking whether the charging connector is properly locked may be included (S106). As the power of the external controller 500 is activated, a V2H operation can be performed, and a state of connection of the VCMS and a cable and compatibility of the battery 100 are checked (S107). This may be performed through controller area network (CAN) communication. Then, the VCMS determines whether the vehicle is connected to the charger or is connected to the external controller 500 for the V2H operation (S108). At this time, the switch 300 is opened upon determining that the vehicle is connected to the charger (S109), and the switch 300 is maintained in a closed state upon determining that the vehicle is connected to the external controller 500 (S110). Then, after insulation of high-voltage components is checked (S111), charging or discharging is started (S112).

FIG. 4 is a flowchart of a V2H power off scenario according to an embodiment of the present invention.

When the VCMS receives a power-off command, the power supplied from the V2H operation starts to be cut off (S201). After confirming that the output voltage is sufficiently low (S202), e.g., less than 10 V, the external controller 500 releases the locked connector for V2H connection (S203). Thereafter, the external controller 500 terminates V2H control (S204), and thus the VCMS opens the switch 300 (S205). As the switch 300 is opened, the power supplied from the battery 100 of the vehicle to the external controller 500 is cut off, which can prevent discharging of the battery 100. After the switch 300 is opened, the VCMS is switched to a power saving mode such that only minimum power is consumed for complete termination of the VCMS (S206). Thereafter, when the cable connected to the charging inlet 400 is removed (S207), the power of the VCMS is also off (S208).

FIG. 5 is a conceptual diagram of control through a mobile device according to an embodiment of the present invention.

The V2H system can be remotely controlled using a mobile device 30. The mobile device 30 may wirelessly communicate with an audio video navigation telematics (AVNT) 50, and the AVNT 50 may communicate with a VCMS and a BMS using CAN communication in a vehicle. Therefore, when the mobile device transmits a command, the AVNT 50 receives the command and transmits the command to the VCMS and the BMS.

As an embodiment, a user may remotely control setting of a minimum state of charge (SOC) of the battery 100 and termination of a V2H operation using a mobile device.

Specifically, since the V2H operation uses the battery 100 of the vehicle, it is necessary to leave a minimum amount of the battery 100 required for vehicle driving. Accordingly, the user may remotely set a minimum state of charge (SOC) of the battery 100 using a mobile device. In this case, when the SOC of the battery 100 set by the user is reached while power is consumed using the V2H operation, the operation automatically enters a V2H termination sequence.

In addition, if the user wants to stop the V2H operation while using electricity at home, he or she can remotely terminate the V2H system using a mobile device.

According to the system and method for controlling charging/discharging of a vehicle of embodiments of the present invention, it is possible to activate the power of a V2H system by supplying power from a vehicle battery and to allow the V2H operation even if a user does not start the vehicle or set the V2H mode.

In addition, in the V2H mode, only the power of charging/discharging related systems is activated to minimize vehicle power consumption, and the V2H operation can be terminated or a minimum SOC can be remotely set using a mobile device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for controlling charging/discharging of a vehicle, the system comprising:
   a vehicle battery;
   an external controller connected to the vehicle and configured to control an exchange of power;
   a switch configured to connect/disconnect the vehicle battery to/from the external controller; and
   a charging/discharging controller configured to:
      control the vehicle battery and the external controller to be connected to each other by closing the switch in response to determining that the vehicle is started or a charging door is opened;
      determine whether the vehicle battery is connected to a charger or to the external controller after the power is activated;
      open the switch in response to determining that the vehicle battery is connected to the charger; and
      maintain the switch in a closed state in response to determining that the vehicle battery is connected to the external controller for discharging the vehicle battery.

2. The system according to claim 1, wherein the charging/discharging controller is configured to activate the power of the charging/discharging controller in response to determining that the vehicle is started or the charging door is opened.

3. The system according to claim 1, wherein the vehicle battery and the external controller are connected through a charging inlet of the vehicle.

4. The system according to claim 3, wherein the charging inlet of the vehicle is configured to use a pin that is unused among a plurality of pins of a charging port in an event a charging cable is connected to charge the vehicle.

5. The system according to claim 1, wherein the charging/discharging controller comprises a microcontroller unit (MCU) and is configured to control the vehicle battery and the external controller to be connected to each other by closing the switch using a signal from the MCU.

6. The system according to claim 1, wherein the charging/discharging controller is configured to perform control such that only power of systems related to charging/discharging is activated.

7. The system according to claim 1, wherein the charging/discharging controller is configured to open the switch in response to the external controller being turned off and switch to a power saving mode in which a cable is removable.

8. The system according to claim 1, wherein the external controller is configured to set a termination command or a minimum state of charge (SOC) of the vehicle battery using a mobile device.

9. A method for controlling charging/discharging of a vehicle, the method comprising:
   activating power of a charging/discharging controller upon recognition of a starting of the vehicle or an opening of a charging door;
   closing a switch connected between a vehicle battery and an external controller by the charging/discharging controller; and
   activating power of the external controller by supplying power of the vehicle battery to the external controller,
   wherein closing the switch comprises:
      determining, by the charging/discharging controller, whether the vehicle battery is connected to a charger or to the external controller;
      opening the switch in response to determining that the vehicle battery is connected to the charger; and
      maintaining the switch in a closed state in response to determining that the vehicle battery is connected to the external controller for discharging the vehicle battery.

10. The method according to claim 9, wherein activating the power of the external controller comprises supplying the power of the vehicle battery to the external controller through a pin that is unused among a plurality of pins of a charging port in response to a charging cable being connected to charge the vehicle.

11. The method according to claim 9, wherein closing the switch comprises controlling, by the charging/discharging controller, the vehicle battery and the external controller to be connected to each other by closing the switch using a signal of a microcontroller unit.

12. The method according to claim 9, further comprising performing control, by the charging/discharging controller, such that only power of systems related to charging/discharging is activated.

13. The method according to claim 9, further comprising setting a termination command or a minimum state of charge (SOC) of the vehicle battery by the external controller using a mobile device.

14. A vehicle comprising:
   a vehicle body;
   a vehicle battery disposed within the vehicle body;
   a charging inlet configured to be coupled to an external controller;
   a switch configured to connect/disconnect the vehicle battery to/from the external controller; and
   a charging/discharging controller configured to:
      control a connection of the vehicle battery and the charging inlet by closing the switch in response to determining that the vehicle is started or a charging door is opened;
      determine whether the vehicle battery is connected to a charger or to the external controller after power is activated;
      open the switch in response to determining that the vehicle battery is connected to the charger; and
      maintain the switch in a closed state in response to determining that the vehicle battery is connected to the external controller for discharging the vehicle battery.

15. The vehicle according to claim 14, wherein the charging inlet of the vehicle is configured to use a pin that is unused among a plurality of pins of a charging port in an event a charging cable is connected to charge the vehicle.

16. The vehicle according to claim 14, wherein the charging/discharging controller comprises a microcontroller unit (MCU) and is configured to control the vehicle battery and the external controller to be connected to each other through the charging inlet by closing the switch using a signal from the MCU.

17. The vehicle according to claim 16, wherein the MCU is configured to receive a termination command or a minimum state of charge (SOC) of the vehicle battery from an audio video navigation telematics of the vehicle.

18. The vehicle according to claim 14, wherein the external controller is configured to set a termination command or a minimum state of charge (SOC) of the vehicle battery using a mobile device.

19. The vehicle according to claim 14, wherein the charging/discharging controller is further configured to open the switch in response to the external controller being turned off and switch to a power saving mode.

* * * * *